United States Patent [19]
Fontana et al.

[11] Patent Number: 5,570,438
[45] Date of Patent: Oct. 29, 1996

[54] ACTIVE-MODE-LOCKING OPTICAL-FIBRE PULSED LASER GENERATOR HAVING A VARIABLE INSTANTANEOUS FREQUENCY

[75] Inventors: Flavio Fontana, Cormano; Pierluigi Franco, Padova, both of Italy

[73] Assignee: Pirelli Cavi S.p.A., Milan, Italy

[21] Appl. No.: 455,549

[22] Filed: May 31, 1995

[30] Foreign Application Priority Data

Jun. 27, 1994 [IT] Italy .................. MI94A1327

[51] Int. Cl.$^6$ ............... G02B 6/28; H04B 10/04
[52] U.S. Cl. ........................ 385/24; 359/188
[58] Field of Search ............... 359/125, 161, 359/173, 180, 181, 188; 385/24, 147; 372/6, 18, 19, 22, 69, 92, 109

[56] References Cited

U.S. PATENT DOCUMENTS

| | | | |
|---|---|---|---|
| 4,439,007 | 3/1984 | Lazay et al. | 385/123 |
| 4,447,125 | 5/1984 | Lazay et al. | 385/123 |
| 4,918,751 | 4/1990 | Pessot et al. | 359/173 |
| 5,185,827 | 2/1993 | Poole | 385/28 |
| 5,189,483 | 2/1993 | Inagaki | 356/73.1 |
| 5,212,711 | 5/1993 | Harvey et al. | 372/18 |
| 5,274,659 | 12/1993 | Poole | 385/28 |
| 5,303,079 | 4/1994 | Gnauck et al. | 359/188 |
| 5,381,426 | 1/1995 | Fontana et al. | 372/18 |

FOREIGN PATENT DOCUMENTS

| | | | |
|---|---|---|---|
| 2271236 | 9/1993 | United Kingdom | H04B 10/18 |
| 92/07430 | 10/1991 | WIPO | H04B 10/18 |

OTHER PUBLICATIONS

Electronics Letters–vol. 29, No. 19, 17 Sep. 1993 Stevenage GB–pp. 1713–1714.
Electronics Letters–vol. 29, No. 20, 30 Sep. 1993, Stevenage GB–pp. 1788–1789.
IEEE Photonics Technology Letters, vol. 3, No. 1, Jan. 1991, New York US pp. 74–76.

Primary Examiner—Akm E. Ullah
Attorney, Agent, or Firm—Brooks Haidt Haffner & Delahunty

[57] ABSTRACT

A high-transmission-speed optical connection comprising a pulse-generation laser source, optical-fibre transmission means and a receiver, in which said optical-fibre means forms an optical fibre path, such that a pulsed signal of the soliton type is subjected to a broadening in time greater than 50% by effect of the chromatic dispersion, in which said laser source comprises an active and harmonic mode-locking optical-fibre laser wherein the fibre length, filter passband and power in the cavity are selected for emitting pulses of a Gaussian temporal profile having such a duration and bandwidth that, at the receiver, the duration of the pulses themselves is not more than 15% higher than the duration at the emission.

28 Claims, 5 Drawing Sheets

ACTIVE-MODE-LOCKING OPTICAL-FIBRE PULSED LASER GENERATOR HAVING A VARIABLE INSTANTANEOUS FREQUENCY

In many circumstances in the telecommunications field the obtention of pulsed laser emissions of a particularly limited duration is desirable.

Pulses of this kind, having a duration δt<100 ps (commonly referred to as very short pulses or, under particular guided propagation conditions as it may happen in optical fibers, "solitons") particularly apply to the digital high-speed (in the order of 10 GBit/s) telecommunications field and are also used for the accomplishment of optical instruments, tests on semiconductor components and also in remote measurements, for example in topography or in the atmospheric radar field.

In the digital high-speed telecommunications field in particular such pulses are employed so as to constitute a carrier which is then modulated by an external modulator in order to originate the digital signal to be transmitted.

To the ends of the present invention, by high transmission speed it is intended a speed of at least 2.5 GBit/s and preferably 10 Gbit/s or higher, or at all events a speed at which the chromatic dispersion phenomena in the fibre can Rive rise to reception problems following a broadening in time of the transmitted pulses.

For the purpose "mode-locking" pulsed laser generators are known, by "mode-locking" being intended a process according to which, in a laser, the different modes oscillate in a mutual constant-phase relationship by effect of a non-linear-behaviour element present in the laser cavity.

Mode-locking laser generators of the passive type are known, which comprise optical-fibre laser devices using erbium-doped optical fibres (for example lasers in the form of 8) in which a fibre ring containing an optical amplifier, acts as a saturable absorber to the wavelength of 1.5 μm, for example; thus pulses are generated in these lasers the frequency of which depends on the laser ring size.

Devices of the above kind are described for example in ELECTRONICS LETTERS, vol. 27, No. 6, Mar. 14 1991, pages 542–543 by D. J. Richardson, R. I. Laming, D. N. Payne, V. Matsas, M. W. Phillips, in ELECTRONICS LETTERS, vol. 27, No. 9, Apr. 25, 1991, pages 730–732, by the same authors, in ELECTRONICS LETTERS, vol. 27, No. 6, Mar. 14, 1991, pages 544–545, by I. N. Duling and in ELECTRONICS LETTERS, vol. 27, No. 3, Jan. 31, 1991, pages 229–230, by G. J. Cowle and D. N. Payne.

Optical-fibre laser devices are also known in which an active modulation device of the electro-optical type is inserted in an optical path forming a laser cavity, so as to force the laser to generate mode-locking pulses having the desired frequency.

Such devices are referred to as active mode-locking devices because the modulation device present therein, operated from the outside, acts on the modes generated in the laser, enabling amplification up to a level supporting the laser emission to the only modes selected by the applied modulation.

Devices of the above type are described for example in OPTICS LETTERS, vol. 14, No. 22, Nov. 15, 1989, pages 1269–1271, by J. D. Kafka, T. Baer and D. W. Hall, in ELECTRONICS LETTERS, vol. 26, No. 3. Feb. 1, 1990, pages 216–217, by A. Takada and H. Miyazawa, and in PROCEEDING OF II TOPICAL MEETING ON OPTICAL AMPLIFIERS, Optical Society of America, 1991, Snowmass Village, Colo., USA, pages 116–119, by T. Pfeiffer and H. Schmuck (SEL Alcatel Research Centre).

Theoretical foundations of mode-locking, both of the active and passive type are shown, for example, in WAVES AND FIELDS IN OPTOELECTRONICS, by Herman A. Haous, issued in 1984 by Prentice-Hall, Inc., Englewood Cliffs, N.J., pages 254–290.

Passive mode-locking generators, operation of which leaves out of consideration an excitation modulation, have the particular feature that they have the emitting frequency of the soliton pulses closely depending on the physical features of the generator, in particular the size of the fibre ring forming the laser system over which a single pulse travels for each reflection.

In active mode-locking generators, on the contrary, the pulse emitting frequency depends on the excitation frequency of a modulator and it enables a great number of locked pulses simultaneously travelling over the ring to be present, and therefore enables the pulse emitting frequency to be previously selected and to be much higher than in the passive-type devices, on the order of GHz for example.

From ELECTRONICS LETTERS, Sep. 2, 1993, vol. 29, No. 18, pages 1652–1653, it is known that in a harmonic mode-locking (HML) laser, when a product of the pulse duration by the bandwidth is obtained which is close to or corresponds to 0.316, the soliton propagation takes place; tinder some conditions the generation of ultrashort solitons having high repetition rates can be achieved without non-linear-gain mechanisms.

In an experiment it has been proved that the emission of solitons free of "chirping" in a fibre laser can be obtained by the use of a band-pass filter of a sufficiently large bandwidth.

By mode-locking it is intended a physical process taking place within a laser into which a device is inserted in which the optical losses are modulated to a frequency corresponding to the separation frequency between two longitudinal cavity modes in succession; mode-locking is called "harmonic" when the modulation frequency of the device is a multiple integer of the above mentioned intermode separation frequency.

A harmonic mode-locking is particularly useful in fibre lasers, in that it enables shorter pulses to be achieved, which have much higher emission frequencies than the inverse of the cavity transit time.

An ideal optical pulse consists of the envelope of a fixed-frequency carrier which is modulated according to a given temporal profile; under these conditions it is proved (see G.P. AGRAWAL, Nonlinear Fiber Optics, ACADEMIC PRESS INC. section 3, paragraph 2, pages 54–64) that, in the absence of chirping phenomena, the spectral amplitude $\Delta v^*$ (at −3 dB from the maximum pulse power) is the least possible one and that it is connected to the pulse duration $\tau$ (measured in the middle of its maximum intensity) through the relation $$\Delta v^* \cdot \tau = a \text{ constant,}$$

wherein the constant value is about 0.316 for hyperbolic-secant field-profile pulses (solitons) and 0.441 for Gaussian profiles (when $\Delta v$ is expressed in Hz and $\tau$ is expressed in s).

By "chirping" it is intended a variation in the instantaneous frequency of the optical carrier enveloped by the laser-generated pulse which is added to the above mentioned minimum spectral amplitude.

A chirping index of an optical pulse $\eta_{chirp}$ can be measured by observing, by means of an optical spectrum analyzer, the bandwidth $\Delta v$ occupied by a pulse having a duration $\tau$ and referring it to the above defined theoretical minimum bandwidth $\Delta v^*$ for a pulse of said duration.

Within the scope of the present invention it has been seen that, in the presence of pulses of the soliton type the nonlinear variation effects in the refraction index in the line fibre due to the high power of the solitons can bring to an unchanged propagation of signals within the step-index fibres, but such a phenomenon which is convenient for high speed transmissions in order to avoid the dangerous effects of a chromatic dispersion, is only efficient as far as the solitons keep a high power value, sufficient to generate the nonlinear variation effect of the refractive index of the glass.

The attenuation in the optical fibre with which connection is made, however, causes the signal, although generated with a high power, to have no longer, after propagation distances in the fibre higher than some ten kilometers, a peak power capable of creating an important nonlinear effect, said signal being therefore subjected to the chromatic dispersion of the line.

In addition, if the starting power is too high, in particular greater than 1.5 P*, wherein P* is a critical value defined as follows:

$$P^* = 1.22 D/\tau^2,$$

wherein

P is the optical power expressed in W,

D is the chromatic dispersion of the fibre, expressed in ps/(nm.km) and $\tau$ is the pulse duration expressed in ps, measured in the middle of its intensity, (see G. P. AGRAWALL, Nonlinear Fiber Optics, ACADEMICS PRESS INC., section 5, for example), instability phenomena occur, such as soliton splitting or approaching and melting of contiguous solitons.

When the power goes below a value corresponding to about half P*, due to the signal attenuation in the line fibre, the pulse, by effect of the chromatic dispersion, widens to such a degree that it can be no longer recovered by self phase modulation (SPM).

For example, in case of pulses having $\tau \approx 30$ ps, P* in a fibre can have a value in the order of about 25 mW, corresponding to 14 dBm.

However, due to the availability of active-fibre optical amplifiers, transmission over distances in the order of some hundred or thousand kilometers is made possible, in the absence of signal regeneration.

Under these conditions too, however, the transmission of a pulse having a peak power decreasing with the propagation distance within the individual fibre lengths included between the amplifiers, causes a prevalence of the nonlinear SPM effect in the line fibre length which is the closest to the last-crossed amplifier (that is when the pulse power is raised to such a level that said nonlinear effects are generated), and of the chromatic dispersion in the length which is the farthest therefrom (when the pulse power has lowered under said value, before being amplified again).

Therefore, even in the presence of optical amplifiers interposed in the line, the local variation of optical power in the line fibre causes a reduction in the maximum connection distance to be achieved by means of solitons for high-speed communications.

In accordance with the present invention it has been found, on the contrary, that, by utilizing a fibre laser with a 1530–1550 nm emission, the use of a band-pass filter having a bandwidth lower than a predetermined value in a fibre laser enabled the achievement of a stable emission of pulses having chirping features capable of allowing transmission in an optical fibre line of the step-index type over a predetermined distance, in the substantial absence of signal widening phenomena detectable at the receiver and due to the chromatic dispersion in the fibre.

In one aspect, the present invention relates to a high-transmission-speed optical connection comprising at least:

a laser source for generating pulsed optical signals of a predetermined wavelength having predetermined duration and spectral amplitude at the emission;

optical-fibre means having an end operatively connected to said laser source for receiving and transmitting said signals, said optical-fibre means having a chromatic dispersion at the wavelength of said source and an attenuation of predetermined unitary values, a receiver operatively connected to the end of said optical-fibre means opposite to said laser source, said optical-fibre means forming an optical fibre path included between the source and the receiver of such a length that a pulsed signal of the soliton type is subjected to a broadening or widening in time greater than 50%, by effect of said chromatic dispersion, characterized in that said laser source comprises an active and harmonic mode-locking optical-fibre laser exhibiting a fibre length, filter pass-band and power in the cavity correlated with the length of said fibre path and establishing, at the emission, the duration and bandwidth of said pulses in such a manner that, on entering the receiver, the duration of said pulses is not more than 15% higher than the duration at the emission.

In particular, said predetermined wave length of said signals is in a band included between 1530 and 1560 n.

In particular, said optical path in the fibre has an overall chromatic dispersion higher than 2000 ps/nm.

More particularly, said optical path in the fibre comprises at least a step-index fibre having a unitary chromatic dispersion higher than 15 ps/nm.

Preferably, the product of the duration by the band width of said pulses is greater than 1.

Preferentially, said path in the fibre included between the source and the receiver has an overall length greater than 50 km and, more preferentially, said path in the fibre included between the source and the receiver has an overall length in the range of 100 to 250 km.

Preferably, the laser includes a band-pass filter having a bandwidth equal to 2 nm±0.5.

Preferably, said laser is an optical-fibre laser.

In a particular embodiment said laser is an optical-fibre ring laser including an erbium-doped active fibre, pumping means for said fibre, active modulation means for modulating the optical signal propagating in the ring and a band-pass filter, all inserted along the ring.

In particular, said modulator is a modulator of the Mach-Zender type in planar optics, made of lithium niobate.

Preferably, said band-pass filter is an interferometric filter.

In particular, said band-pass filter is an acoustooptical filter.

Preferentially said pumping means comprises a 980 nm-wavelength laser.

In a further particular embodiment, said optical fibre laser is a linear-cavity laser.

Preferably, the optical peak power of said pulsed signals in said fibre path is lower than 20 dBm.

More preferentially, said fibre path includes at least one optical amplifier.

In a second aspect, the present invention relates to an optical-fibre high-transmission-speed telecommunications system comprising the steps of:

generating pulsed signals through a laser source, at a predetermined wavelength;

modulating said pulsed signals into a digital form;

supplying said pulsed signals to an optical path having such predetermined overall chromatic dispersion and attenuation that a pulsed signal of the soliton type is subjected to a broadening in time greater than 50% by effect of said chromatic dispersion;

receiving said signals by means of a receiver, characterized in that said pulsed signals are generated in the form of pulses having a Gaussian temporal profile, in which the product of the duration by the bandwidth at the emission is greater than a predetermined value, so that on entering the receiver, the duration of the same pulses is not more than 15% greater than the duration at the emission, said laser source comprising an active and harmonic mode-locking optical-fibre laser.

In particular, said predetermined wavelength of said signals is in a band included between 1530 and 1560 n.

Preferably, said product of the duration by the bandwidth at the emission is greater than 1.

More preferably, said product of the duration by the bandwidth at the emission is greater than 2.

In a further aspect the present invention relates to an active and harmonic mode-locking optical-fibre laser comprising:

an optical-fibre cavity of a predetermined overall length, said cavity including a doped active fibre in which the dopant is a fluorescent dopant, pumping means for said active fibre, feedback means associated with said optical-fibre laser cavity, said active fibre, pumping means and feedback means determining an optical power of predetermined value in the cavity, a band-pass filter of predetermined amplitude, active modulation means, characterized in that the length of said optical-fibre cavity, the pass band of said band-pass filter, the optical power in the cavity are correlated so as to give, at the exit from the laser, such a Gaussian-profile signal, of a duration <35 ps and a product of the duration by the bandwidth $\Delta v \cdot \tau \geq 1$, that the duration of said pulses after a path of travel of at least 20 km over an optical step-index fibre is not more than 15% greater than the duration at the emission.

Preferably, the duration of said Gaussian-profile signal is $\leq 30$ ps.

Preferably the product $\Delta v \cdot \tau$ is included between 2 and 5.

In particular, said active fibre is preferentially an erbium-doped optical fibre.

In a particular embodiment, said optical-fibre laser is a ring laser; in an alternative embodiment, said optical-fibre laser is a linear-cavity laser.

Preferentially, the bandwidth of said band-pass filter is equal to 2 nm±0.5.

More details will appear from the following description, with reference to the accompanying drawings, in which.

Figure 1:
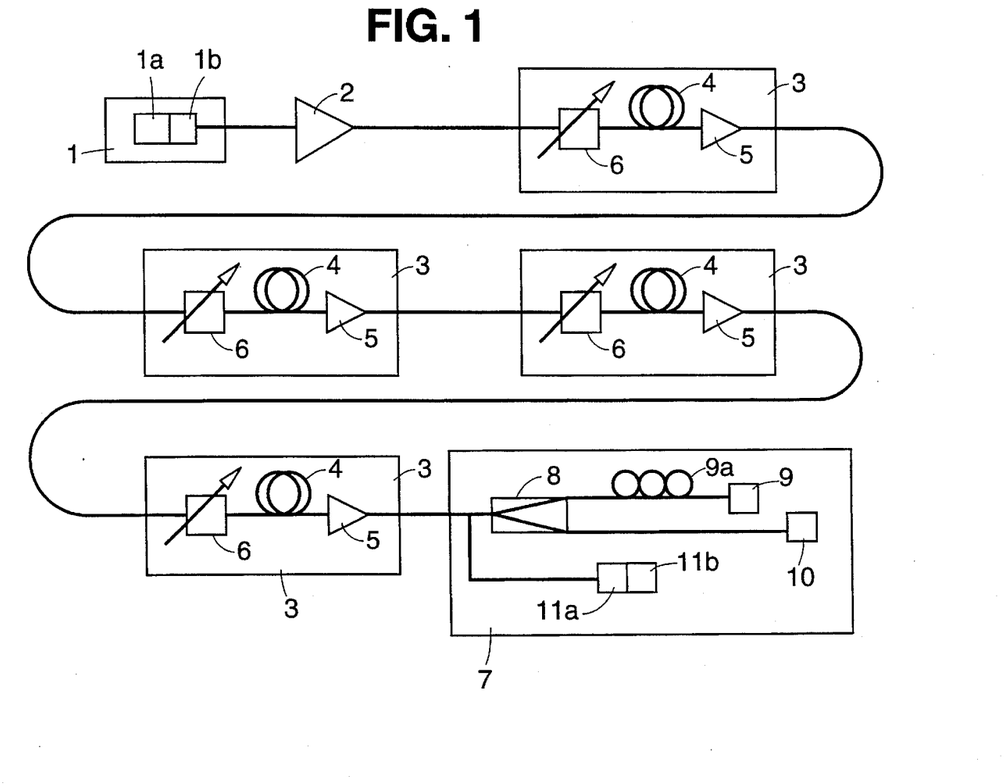
FIG. 1 is a diagram of the experimental configuration adopted for making an optical connection.

An optical connection was made by installing a transmission station 1 comprising a laser 1a and a modulator 1b, followed by a first booster 2 and four line portions, each of them generally identified by 3 and each comprising an optical transmission fibre 4, an optical amplifier 5 and a variable attenuator 6.

At the connection end, at the exit of the last-stage amplifier 5 there was a reception and measurement station 7 comprising a 5/95-separation coupler 8, an autocorrelator 9 and an optical spectrum analyzer 10.

The autocorrelator was preceded by a polarization controller 9a, made of three optical fibre turns susceptible of orientation in space with respect to each other in order to obtain the requested polarization at the instrument entry.

Alternatively, in place of the autocorrelator 9 and spectrum analyzer 10, the reception and measurement station was comprised of an optical signal detector 11a, consisting of a photodiode, and a sampler oscilloscope 11b connected thereto.

The booster 2, as well as the amplifiers. 5 of each transmitting unit 3 are all erbium-doped optical-fibre amplifiers of a commercially available type, the saturation output power of which is 14 dBm.

The amplifiers used are a TPA/E-14 model produced and put on the market by the Applicant.

The fibres consist each of a 50-km-long mono-mode step-index optical fibre portions or lengths of the commercial type having the following features:

attenuation: 0.25 dB/km dispersion coefficient of group velocity $\beta_2 = -20$ ps²/km at 1530 nm Type "TITAN (registered trademark) SMF"

produced by CORNING Inc., Corning, N.Y. (USA);

the overall length of the optical fibre included between the transmission station 1 and the reception station 8 was about 200 km.

The variable attenuators 6 were attenuators having an adjustable attenuation between 1 and 30 dB and were designed to adjust the average power entering the line portions so as to ensure the pulse propagation according to the intended planning modalities; the attenuators used were a MTP-3 model produced and marketed by A-TEK S.r.l., Trezzano Rosa, Milan (IT).

The coupler 8 was a device having a 95/5 division ratio, of a commercial type, for example model 1550 POH 95/5 2×2 produced by Gould Inc., Fibre Optic Division, Baymeadow Drive, Glem Burnie, Md. (USA). The autocorrelator 9 was a second-harmonic generation autocorrelator, model FR-1 3KR produced by FEMTO-CHROME INC., 2123 4th Street, Bekeley, Calif. (USA).

In addition, the emission band was measured by means of the optical spectrum analyzer 10; the apparatus used is a TQ8346 model produced by AVANTEST, 300 Knightsbridge Parkway, Lincolnshire Ill. 60069 Illinois, USA. The photodiode 11a was a MP9653A model produced by ANRITSU C0RPORATION, 5-10-27 Minato-ku, Tokyo (JP).

The model of the sampler oscilloscope 11b was CSA 800 Communications Signal Analizer, available from TEKTRONIX S.p.A., via Lampedusa 13, Milan (IT).

The reception and measurement station, which in FIG. 1 is connected to the end of the 200-meter-long overall connection, during the execution of the experiment could be also directly connected to the exit of the transmitting station 1 in order to detect the primary features of the transmitted signal.

Figure 2:
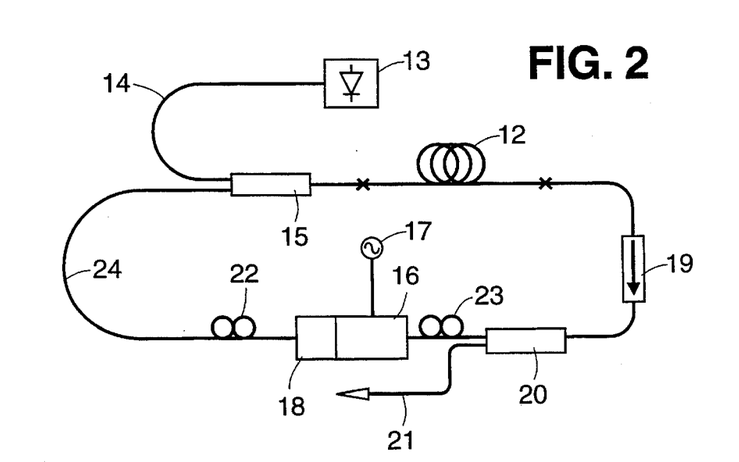
FIG. 2 shows the schematic diagram of a fibre laser used in the experiment of FIG. 1.

The structure of laser 1 used for generating the transmission signal is shown in detail in FIG. 2.

As shown in FIG. 2, the laser is of the ring type and comprises an active fibre portion 12 connected to a pump laser diode 13 through a fibre 14 and a dichroic coupler 15, an electrooptical width modulator 16 connected to a piloting radio-frequency generator 17, a band-pass filter 18, an optoisolator 19 adapted to enable a one-way light propagation in the ring, and a 50/50-separation coupler 20, by which the generated signal is drawn at the output line 21.

To the ends of the present invention, by "radio-frequency (RF)" it is intended a frequency from 100 MHz to 2–3 GHz or higher.

The polarization controllers 22, 23 disposed before and after the modulator enable adjustment of the polarization of the circulating light signal depending on the double-refraction features of both the modulator and the laser cavity.

The laser ring further comprises several optical fibre portions 24, by means of which said components are sequentially connected with each other.

The width modulator 16 is a travelling-wave Mach Zender interferometer modulator of a commercially available type, having a bandwidth of 18 GHz; the model used is produced by NEW FOCUS INC., 1275 Reamwood Avenue, Sunnyvale, Calif., USA.

The electronic RF pulse generator 17 is embodied by model PIP 83731A, produced by HEWLETT PACKARD, having an output power of 25 dBm and a modulation frequency up to 20 GHz.

The active fibre 12 features are as follows:

| | |
|---|---|
| fiber length | 15 m |
| fiber type | Si/Al |
| numerical aperture $(n1^2 - n2^2)^{1/2}$ | NA = 0.19 |
| cutoff wavelength (LP11 cut-off) | $\lambda_c$ = 900 nm |
| erbium content in the core | 300 ppm. |

(By n1 and n2 it is intended the refractive indices of the fibre core and cladding, respectively).

The dichroic coupler 15 is a melted fibre coupler, made of two mono-mode fibres having a wave length of 980 and 1536 nm, with a <0.2 dB variation in the optical outgoing power thereof depending on polarization; the coupler used was expressly made using fibres having the features of the above active fibre 12, apart from the erbium content, erbium being absent.

Dichroic couplers of the above type are known and produced for example by Gould Inc., Fibre Optic Division, Baymeadow Drive, Glem Burnie, Md. (USA) and by Sifam Ltd., Fibre Optic Division, Woodland Road Torquay, Devon (GH).

The pump laser diode 13 is a laser type "Strained Quantum Well", having the following features:

| | |
|---|---|
| emission wavelength | $\lambda_p$ = 980 nm |
| maximum optical output power | $P_u$ = 65 mW |

Lasers of the above type are for example produced by David Sarnoff Research Center, Washington Rd, Princetown, N.J. (USA).

The coupler 20 is a commercially available device having a division ratio of 50/50, such as for example model 1550 POH 50/50 2×2 produced by the above mentioned firm Gould Inc.

The optoisolator 19 is an optical isolator providing a polarization control of a type independent of the polarization of the transmission signal, in which isolation is greater than 35 dB and reflectivity is lower than −50 dB.

The isolator used is a model MDL I-15 PIPT-A S/N 1016 available from ISOWAVE, 64 Harding Avenue, Dover, N.J., USA.

The optical fibres 24, through which the different laser components are connected with each other, are mono-mode optical fibres type 8/125 (wherein 8 is the core diameter, and 125 the cladding diameter in the fibre, expressed in μm), having a germanium-doped core and a numerical aperture NA=0.11.

The overall length of the ring forming the laser cavity was about 35 m.

The polarization control elements 11, 22, 23 consist of several optical fibre 7 coils disposed in succession and supported in an adjustable manner relative to a common alignment axis so as to carry out the desired adjustment.

In the described experiment, for the polarization control elements 22, 23 of the laser, coils with a diameter of about 6 cm and made up of the interconnecting optical fibres 24 themselves were used, whereas for the polarization control element 11, the interconnecting optical fibre to the autocorrelator 9 was used, the turns having the same diameter.

The orientation of the turns was experimentally determined in connection with the overall transmissive features of the laser ring and the polarization required by the autocorrelator.

Devices of the above type can be made up for the purpose, using the fibres of the laser ring as pointed out, or commercially available devices can be employed, such as those from GEC MARCONI MATERIALS TECHNOLOGY ltd, Caswell, Towcester Northants NN12 8EQ (Great Britain).

While the polarization control element is preferably made of adjustable coils, as above described, depending on the particular application features, also polarization controllers of different type may be used, such as liquid crystal controllers, available from ADVANCED OPTRONICS Inc., 2121 Ringwood Ave., San Jose, Calif., USA, or planar optics controllers or the like by which the desired polarization adjustment of the signal circulating in the laser cavity is achieved.

Experimental Results

Using the experimental configuration shown in FIG. 2 laser emission experiments were carried out; the modulation frequency was set to 10 GHz; the modulation power of generator 17 was set to 20 dBm.

In all tests carried out, an amplitude in time $\tau_{FWHM}$ of the Gaussian pulses emitted from the laser in the range of 15 to 20 ps was achieved.

By amplitude in time $\tau_{FWHM}$ of the pulses emitted from the laser it is intended the duration at a middle height of the considered pulse (in an intensity/time diagram); said amplitude is measured by means of the above mentioned autocorrelator 9.

In the instrument the pulse duration is measured by the second-harmonic generation phenomenon in a $LiIO_3$ crystal.

For the purpose, within the instrument the input pulse is divided into two portions, one of which is spaced in time relative to the other by a delay value which can be adjusted by modifying the length of its optical path of travel. On varying the relative delay, the second-harmonic generation phenomenon passes from a maximum (when the two pulses are overlapped) to zero (when the two pulses are completely separated).

By correlating the width of the generated second harmonic with the delay values corresponding thereto (calculated on the basis of the optical path modification) the duration of the analyzed pulse is drawn.

Experiment 1

One experiment was performed with a laser free of filter 18.

Figure 3:
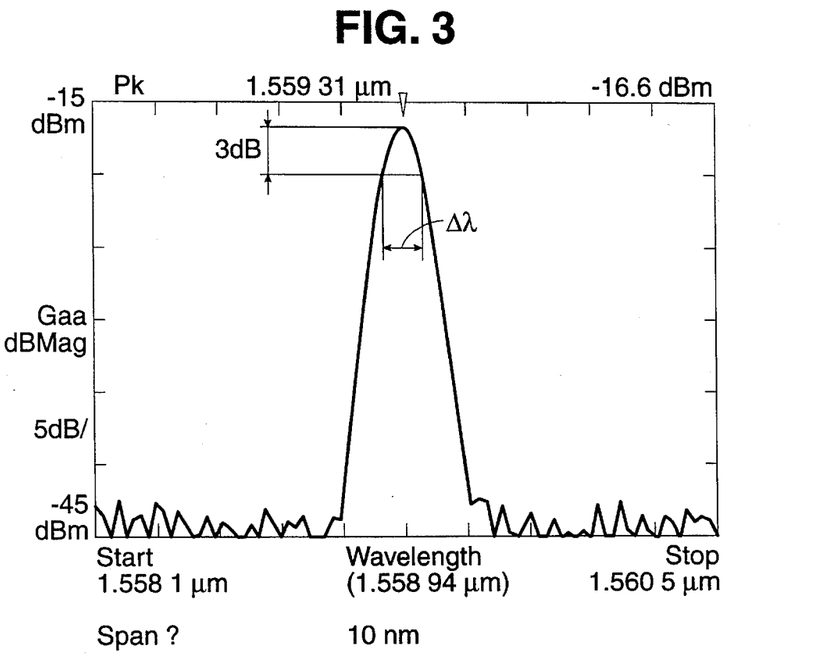
FIG. 3 is a graph showing the spectrum of a pulse generated by the laser in FIG. 2, free of a band-pass filter, measured at the emission.
Figure 4:
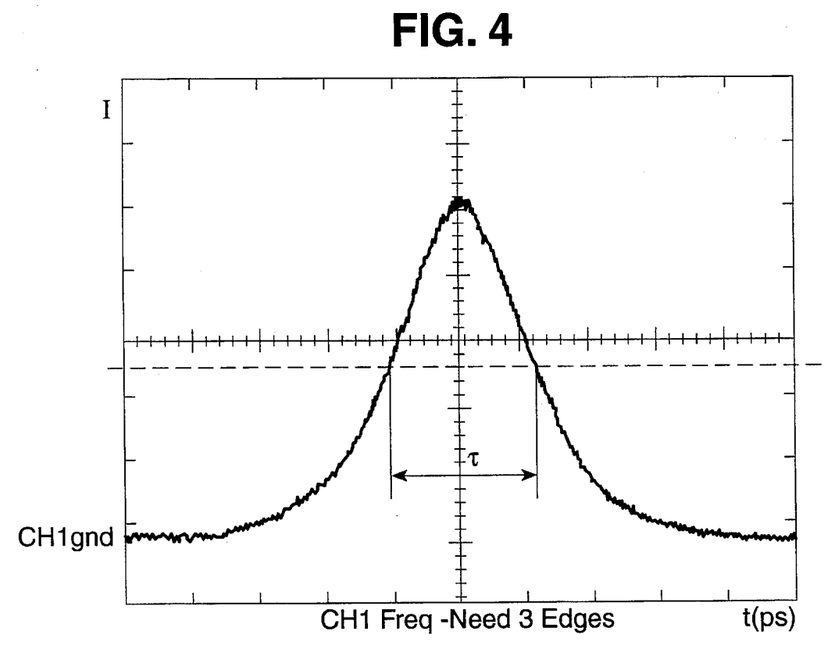
FIG. 4 shows the pulse autocorrelation track of the spectrum in FIG. 3, measured at the emission.

Under such conditions the laser provided an emission the spectrum of which is shown in FIG. 3 and the temporal profile of which, at the emission, as detected by autocorrelator 9, is shown in FIG. 4.

In particular, the obtained pulses had the following features:

| | |
|---|---|
| repetition rate | 10 Gbit/s |
| average output power | 6 mW |
| bandwidth at −3 dB from the peak | $\Delta\lambda = 0.12$ nm |
| | ($\Delta v = 14.7$ GHz) |
| pulse duration at a middle height | $\tau = 21.5$ ps. |

Thus a product of the duration by the bandwidth =0.316 is obtained, which is practically equal to the typical values of solitons.

Experiment 2

In a second experiment a band-pass filter 18 was used, consisting of a tunable filter with a 2 nm wide transmission window, the wavelength of maximum transmission of which could be varied between 1520 and 1580 nm by modifying the inclination of an interferometric plate by means of a high-precision micrometer.

The filter used was a TB 1570-NC-103 model produced by JDS OPTICS, JDS Fitel Inc., Nepean, Ontario, Canada.

Figure 5:
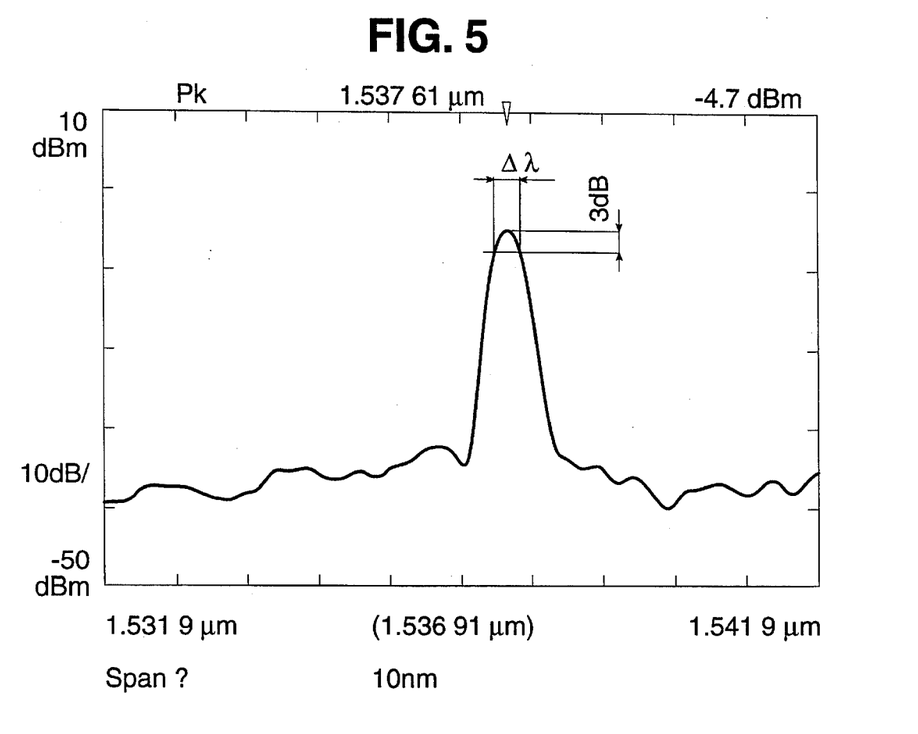
FIG. 5 is a graph showing the spectrum of a pulse generated by the laser in FIG. 2, in the presence of a filter having a 2 nm bandwidth, measured at the emission.
Figure 6:
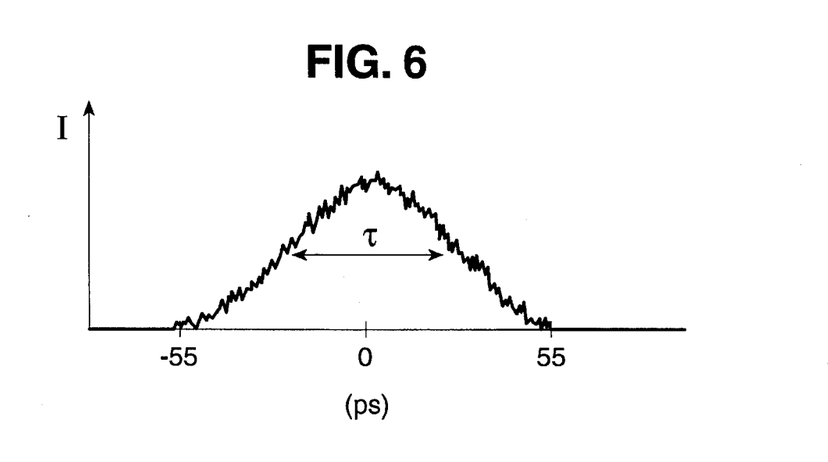
FIG. 6 shows the pulse autocorrelation track of the spectrum in FIG. 5, measured at the emission.

Under such conditions the laser provided an emission the spectrum of which is shown in FIG. 5 and the temporal profile of which at the emission is shown in FIG. 6.

In particular the obtained pulses had the following features:

| | |
|---|---|
| repetition rate | 10 Gbit/s |
| average output power | 6 mW |
| bandwidth at −3 dB from the peak | $\Delta\lambda = 0.5$ nm |
| | ($\Delta v = 65$ GHz) |
| pulse duration at a middle height | $\tau = 33$ ps. |
| | $\Delta v.\tau = 2.145$ |

For a pulse of this duration, the bandwidth corresponding to a soliton pulse (that is free of chirping) would be $\Delta v^* = 10$ GHz; therefore the chirping index of the generated pulse is $\Delta v/\Delta v^* = 6.5$, thereby showing the presence of an important chirping effect in the pulse. The measurements the graphs of which are reproduced in FIGS. 3 to 6 were obtained by directly connecting the laser output fibre to the reception station 8.

Experiments 3, 4

Signals generated in experiments 1, 2 were used in the transmission line shown in FIG. 1.

Each signal was fed to the booster 2 and then, through the four line portions 3, to the optical amplifier 7 and the reception instruments 9, 10.

In particular, the attenuators 6 were adjusted so that in each section there was an average signal power, after amplification, of about 13–14 dBm (said value being selected depending on the fibre length and type in each portion which, as previously described, consisted of a 50 km long step-index fibre).

The polarization selector 11 was adjusted so as to obtain the required polarization at the autocorrelator entry (adjustment was carried out manually looking for the maximum value of the signal coming out of the autocorrelator according to the instrument use specifications).

In experiment 3 the signal of experiment 1 generated by a laser emitting pulses of the soliton type ($\Delta v \cdot \tau = 0.316$) could not be received distinctly.

Figure 7:
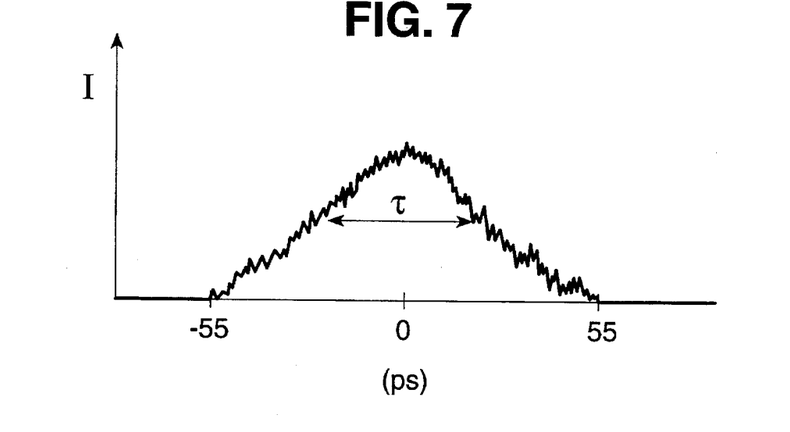
FIG. 7 shows the pulse autocorrelation track of the spectrum in FIG. 5. measured at the receiver of the optical connection of FIG. 1.

In experiment 4 the graph of FIG. 7 was obtained, which represents the signal autocorrelation track of the experiment 2 (pulses provided with chirping) as received after the optical connection amplified by about 200 km in all, four optical amplifiers being included.

The signal of experiment 2 appeared to have the same spectrum as at the start and a duration $\tau = 31$ ps, slightly lower than the amplitude at the emission, being adapted to offer a high quality transmission.

It is to be noted that for communications at a speed of 10 GBit/s there is a time window of 100 ps and that in this context pulses that do not occupy more than about ⅓ of such a time window are considered as acceptable.

By comparing FIGS. 6 and 7 it will be recognized that with the signal of experiment 2 the transmission could be carried out without the signal itself undergoing changes capable of impairing the reception quality.

Experiment 5

In a further experiment conducted with laser 1 provided with the band-pass filter 18 having a width of 2 nm, pulses having the following features were generated:

| | |
|---|---|
| repetition rate | 10 Gbit/s |
| average output power | 6 mW |
| bandwidth at −3 dB from the peak | $\Delta\lambda = 0.38$ nm |
| | ($\Delta v = 49.4$ GHz) |
| pulse duration at a middle height | $\tau = 29$ ps. |
| | $\Delta v.\tau = 1.43$ |
| chirping index | $\Delta v/\Delta v^* = 4.5$. |

Figure 8:
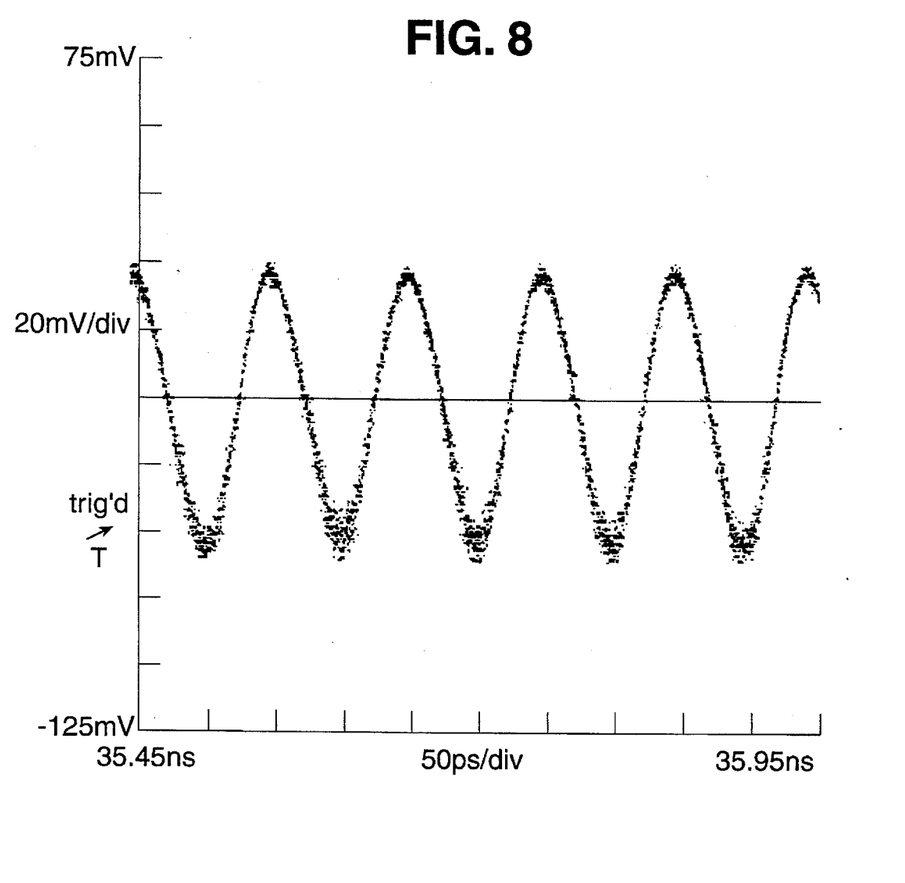
FIG. 8 shows the graph of a series of pulses generated by the laser seen in FIG. 2, in the presence of the 2 nm-bandwidth filter, measured at the emission.
Figure 9:
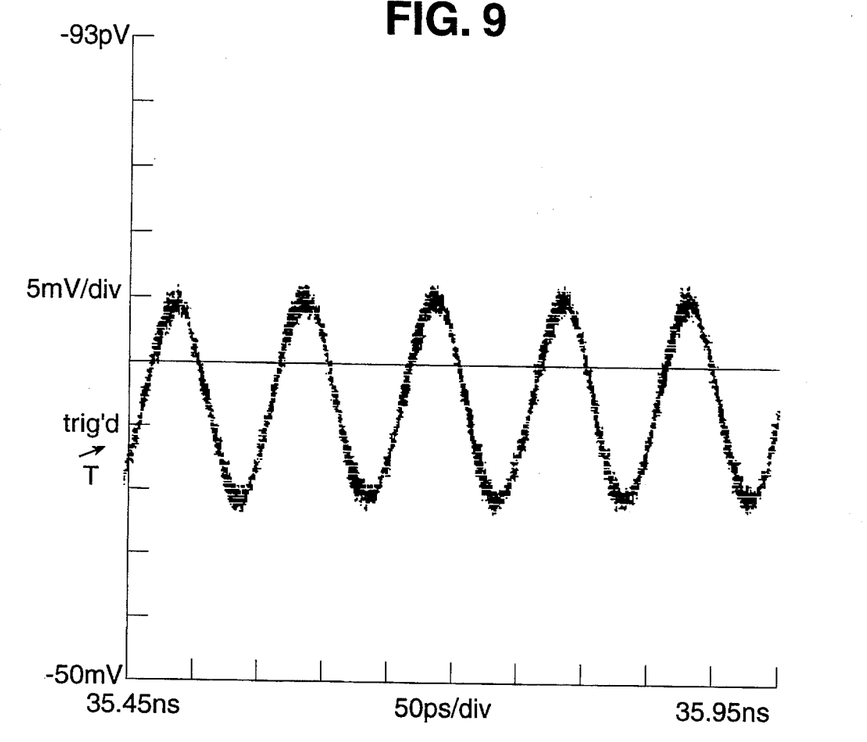
FIG. 9 shows the graph of a series of pulses generated by the laser seen in FIG. 2, in the presence of the 2 nm-bandwidth filter measured at the receiver of the optical connection of FIG. 1.

By the sampler oscilloscope 11b, replacing the autocorrelator 9 and the spectrum analyzer 10, the time plottings of the signals at the emission and reception were detected and represented in FIGS. 8 and 9, respectively.

As is clear from a comparison of said diagrams, the generated signal was able to keep its qualitative features unchanged at the end of the transmission line, in particular by keeping the pulses separated and regularly spaced apart at the same generation frequency.

Interpretation of the results

The achieved results are judged to be mainly due to the fact that, with signals provided with chirping over a first portion of the connection, the signals themselves were subjected to become narrower by effect of the chirp they possessed, as far as they reached the minimum duration permitted for Gaussian pulses (that is as far as a value giving rise to a product $\Delta v \cdot \tau 0.441$ could be reached, while the spectral profile of the pulse remained substantially unchanged); in the remaining fibre portion the signal was subjected to dispersion, so that a broadening in time arose.

In addition, it is deemed that in the optical fibre portions close to the exit of each amplifier, non-linear SPM effects occurred although to a smaller extent as a result of the limited optical powers at stake, which effects assisted in causing the temporal narrowing of the pulses or in limiting broadening of same.

The overall length of the connection, together with the "chirping" (spectral broadening) features of the transmitted signal, enabled the obtention of a pulse at the reception that substantially had the same duration features as the primary pulse.

The soliton signals, on the contrary, propagated substantially unchanged over a portion, but, since they could not keep enough power over the whole path in the connecting fibres in order to ensure a sufficient SPM effect, they were subjected to an increasing broadening in time that made it impossible to receive them.

In particular, in the fibres of the experiment, a soliton pulse having a width of 21.5 ps, after about 15 km of fibre went below the critical power value $P^* = 1.22 \, D/\tau^2$ by 0.5.

Figure 10:
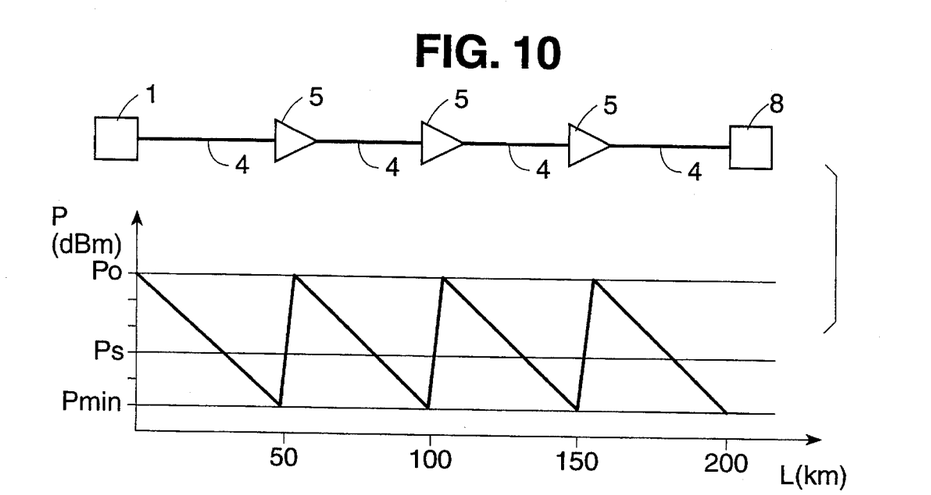
FIG. 10 is a diagram showing an optical connection.

As shown in FIG. 10, where an amplified optical connection is diagrammatically shown, which comprises a laser source 1, optical line fibres 4, optical amplifiers 5 and a reception station 8, as already described, the signal power having a value $P_o$ at the emission, decreased, due to the line attenuation, as far as a value $P_{min}$ at the entry of each amplifier; therefore within the amplifier the signal is amplified as far as it goes back to a high value, the value $P_o$ again for example, for travelling over a subsequent portion of the optical connection. In an optical connection comprising lumped amplifiers therefore, the power in the connection appears to have a substantially saw-tooth profile, between a maximum at the exit of each amplifier (12–14 dBm for example) and a minimum at the entry of the subsequent amplifier (0 dBm for example); in said connection with lumped amplifiers, while the average power in the line is high (6–7 dBm in the example), there are optical fibre portions in which it is low to an unacceptable degree for supporting a soliton propagation.

With signals provided with chirping as above described, on the contrary, in a first portion of the overall connection a temporal contraction of the pulses is caused until the theoretical minimum value, which can be recovered in the remaining portion of the connection.

The choice of the spectral features of the pulses, in connection with the signal power in the line, the overall length of the connection and the attenuation features of the line itself, enables the signals to take their original features again at the end of the connection, that is when reception and acknowledgement of the signals is required.

Based on the foregoing, in one aspect of the present invention it has been found that, for high-speed transmission over high distances in fibres of the step-index type, a true transmission can be achieved by generating a pulsed signal provided with chirping features adapted to the required overall connection distance.

In a second aspect, it has been found that a signal having such features could be generated in a stable and repeatable manner by a fibre laser provided with appropriate operating and structural features, and in particular with a band-pass filter of predetermined width.

To the ends of the present invention, by high distances it is intended distances travelled over by a signal in an optical fibre connection optionally including optical amplifiers, along which, at least over an important fibre portion, there are signal powers in the fibre that are insufficient to generate non-linear variation effects of the refractive index supporting a stable soliton propagation over the whole line, and are capable of giving a signal deformation by chromatic dispersion inconsistent with the desired transmission speed.

A laser of the semiconductor type could possess a "chirping" capable of enabling a propagation of appropriate characteristics, but the characteristics of this chirping cannot be repeated for industrial use purposes, being connected with the inner structure of the semiconductor laser.

For example, from "Archiv fur Elektronik und Uebertragungstechnik", vol. 43, No. 6, pages 398–400, one learns that with laser diodes the chirping repeatability can be hardly achieved due to its being responsive to minimum geometrical unevennesses; in particular, it is pointed out that at low modulation frequencies, chirping of each sign can be measured.

Practically, by way of example, with commercially available semiconductor lasers, directly modulated to 10 Gbit/s, an important variability can be expected both in the absolute values of the chirping index (2–5) and in the chirping sign, that can pass from plus to minus during the pulse development.

With a laser of the above kind the frequency compensation of the chirping must be carried out in a different manner on each individual semiconductor diode.

With a laser according to the present invention, on the contrary, the characteristics of the emitted signal are steady and constant, being determined by the construction parameters of the laser, that can be easily checked and repeated with a high degree of precision, in particular as regards the passband width of the fibre, the optical power circulating in the cavity, the overall length of the fibre path: these magnitudes, in combination, are selected to give a Gaussian-profile signal at the exit from the laser, preferably having a duration <35 ps and more preferably equal to about 30 ps (for a transmission at 30 GBit/s) and a product of the duration by the bandwidth preferably $\geq 1$, to be selected in relation to the desired connection distance.

Preferentially, for connections in the order of 200–300 km which are of interest in telecommunications, a product $\Delta v \cdot \tau$ included between 2 and 5 is convenient.

A person skilled in the art, taking into account the desired performance, will be able to find out the most appropriate parameter combination for putting the invention into practice and adapting it to the specific applications, based on known theoretical principles, as pointed out for example in ELECTRONICS LETTERS, Sep. 2, 1993, vol. 29, No. 18, pages 1652–1653 (already mentioned).

It is also deemed that a variation of $\pm 0.5$ nm in the passband width of the filter with respect to the preferred value of 2 nm does not bring about important performance differences; in addition, variations in the pulse duration of $\pm 15\%$ are deemed still acceptable to the ends of a correct reception.

While the invention has been specifically described with reference to a ring-shaped cavity laser, in the same manner the present invention also applies to a fibre laser having a different structure, and in particular in linear-cavity or standing-wave lasers in which the selection of the structural and operating features such as filter passband, optical power in the cavity, cavity sizes, is made based on the described criteria, in order to lead to the emission of pulses having similar chirping features, adapted to carry out the transmission in the absence of inacceptable pulse deformations at the stated conditions.

We claim:

1. A high-transmission-speed optical connection comprising at least:

a laser source fop generating pulsed optical signals of a predetermined wavelength having predetermined duration and spectral amplitude at the emission;

optical-fibre means having an end operatively connected to said laser source for receiving and transmitting said signals, said optical-fibre means having a chromatic dispersion at the wavelength of said source and an attenuation of predetermined unitary values, a receiver operatively connected to the end of said optical-fibre means opposite to said laser source, said optical-fibre means forming an optical fibre path included between the source and the receiver of such a length that a pulsed signal of the soliton type is subjected to a broadening or widening in time greater than 50%, by effect of said chromatic dispersion, characterized in that said laser source comprises an active and harmonic mode-locking optical-fibre laser exhibiting a fibre length, filter pass-band and power in the cavity correlated with the length of said fibre path and establishing, at the emission, the duration and bandwidth of said pulses in such a manner that, on entering the receiver, the duration of said pulses is not more than 15% higher than the duration at the emission.

2. A high-transmission-speed optical connection according to claim 1, characterized in that said predetermined wave length of said signals is in a band included between 1530 and 1560 n.

3. A high-transmission-speed optical connection according to claim 1, characterized in that said optical path in the fibre has an overall chromatic dispersion higher than 2000 ps/nm.

4. A high-transmission-speed optical connection according to claim 3, characterized in that said optical path in the fibre comprises at least a step-index fibre having a unitary chromatic dispersion higher than 15 ps/nm.

5. A high-transmission-speed optical connection according to claim 1, characterized in that the product of the duration by the band width of said pulses is greater than 1.

6. A high-transmission-speed optical connection according to claim 1, characterized in that said path in the fibre included between the source and the receiver has an overall length greater than 50 km.

7. A high-transmission-speed optical connection according to claim 6, characterized in that said path in the fibre included between the source and the receiver has an overall length in the range of 100 to 250 km.

8. A high-transmission-speed optical connection according to claim 1, characterized in that the laser includes a band-pass filter having a bandwidth equal to 2 nm±0.5.

9. A high-transmission-speed optical connection according to claim 1, characterized in that said laser is an optical-fibre laser.

10. A high-transmission-speed optical connection according to claim 9, characterized in that said laser is an optical-fibre ring laser including an erbium-doped active fibre, pumping means for said fibre, active modulation means for modulating the optical signal propagating in the ring and a band-pass filter, all inserted along the ring.

11. A high-transmission-speed optical connection according to claim 10, characterized in that said modulator is a modulator of the Mach-Zender type in planar optics, made of lithium niobate.

12. A high-transmission-speed optical connection according to claim 1, characterized in that said band-pass filter is an interferometric filter.

13. A high-transmission-speed optical connection according to claim 1, characterized in that said band-pass filter is an acoustooptical filter.

14. A high-transmission-speed optical connection according to claim 10, characterized in that said pumping means comprises a 980 nm-wavelength laser.

15. A high-transmission-speed optical connection according to claim 9, characterized in that said optical fibre laser is a linear-cavity laser.

16. A high-transmission-speed optical connection according to claim 1, characterized in that the optical peak power of said pulsed signals in said fibre path is lower than 20 dBm.

17. A high-transmission-speed optical connection according to claim 1, characterized in that said fiber path includes at least one optical amplifier.

18. An optical-fibre high-transmission-speed telecommunications system comprising the steps of:

generating pulsed signals through a laser source, at a predetermined wavelength;

modulating said pulsed signals into a digital form;

supplying said pulsed signals to an optical path having such predetermined overall chromatic dispersion and attenuation that a pulsed signal of the soliton type is subjected to a broadening in time greater than 50% by effect of said chromatic dispersion;

receiving said signals by means of a receiver, characterized in that said pulsed signals are generated in the form of pulses having a Gaussian temporal profile, in which the product of the duration by the bandwidth at the emission is greater than a predetermined value, so that on entering the receiver, the duration of the same pulses is not more than 15% greater than the duration at the emission, said laser source comprising an active and harmonic mode-locking optical-fibre laser.

19. An optical-fibre high-transmission-speed telecommunications system according to claim 18, characterized in that said predetermined wavelength of said signals is in a band included between 1530 and 1560 nm.

20. An optical-fibre high-transmission-speed telecommunications system according to claim 20, characterized in that said product of the duration by the bandwidth at the emission is greater than 1.

21. An optical-fibre high-transmission-speed telecommunications system according to claim 20, characterized in that said product of the duration by the bandwidth at the emission is greater than 2.

22. An active and harmonic mode-locking optical-fibre laser comprising:

an optical-fibre cavity of a predetermined overall length, said cavity including a doped active fibre in which the dopant is a fluorescent dopant, pumping means for said active fibre, feedback means associated with said optical-fibre laser cavity, said active fibre, pumping means and feedback means determining an optical power of predetermined value in the cavity, a band-pass filter of predetermined amplitude, active modulation means, characterized in that the length of said optical-fibre cavity, the pass band of said band-pass filter, the optical power in the cavity are correlated so as to give, at the exit from the laser, such a Gaussian-profile signal, of a duration <35 ps and a product of the duration by the bandwidth $\Delta v \cdot \tau \geq 1$, that the duration of said pulses after a path of travel of at least 20 km over an optical step-index fibre is not more than 15% greater than the duration at the emission.

23. An active and harmonic mode-locking optical-fibre laser according to claim 22, characterized in that the duration of said Gaussian-profile signal is $\leq 30$ ps.

24. An active and harmonic mode-locking optical-fibre laser according to claim 22, characterized in that the product $\Delta v \cdot \tau$ is included between 2 and 5.

25. An active and harmonic mode-locking optical-fibre laser according to claim 22, characterized in that said active fibre is an erbium-doped optical fibre.

26. An active and harmonic mode-locking optical-fibre laser according to claim 22, characterized in that said optical-fibre laser is a ring laser.

27. An active and harmonic mode-locking optical-fibre laser according to claim 22, characterized in that said optical-fibre laser is a linear-cavity laser.

28. An active and harmonic mode-locking optical-fibre laser according to claim 22, characterized in that the bandwidht of said band-pass filter is equal to 2 nm±0.5.

* * * * *